Nov. 8, 1966  G. D. JONES ET AL  3,283,656
COLOR REVERSIBLE ELECTROCHEMICAL LIGHT FILTER
UTILIZING ELECTROLYTIC SOLUTION
Filed Jan. 7, 1963
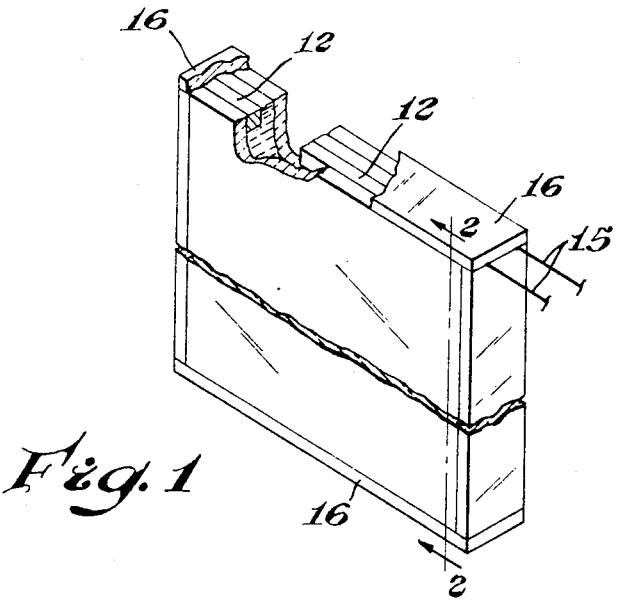
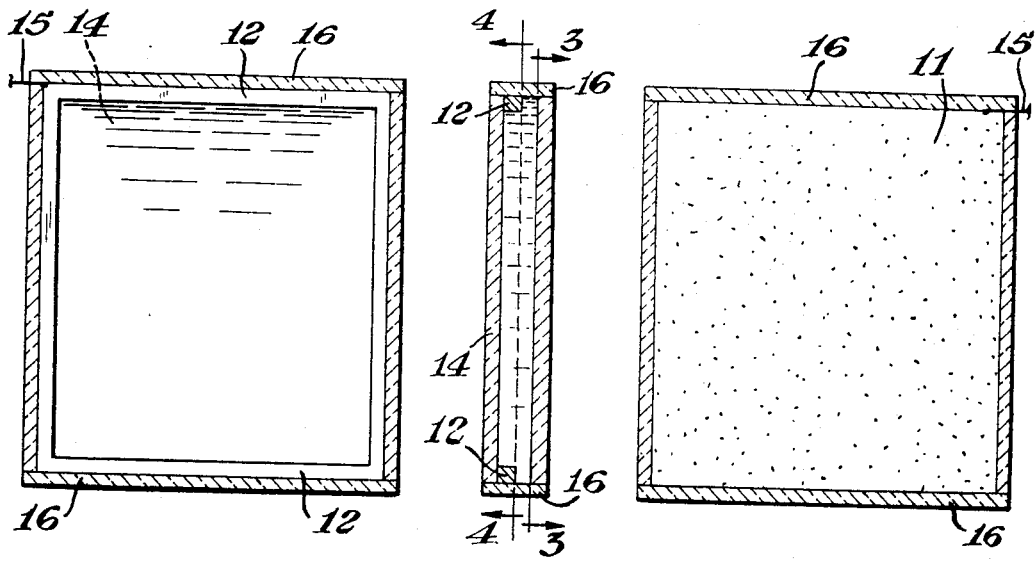
INVENTORS.
Giffin D. Jones
Ralph E. Friedrich
BY Griswold & Burdick
ATTORNEYS

United States Patent Office 3,283,656
Patented Nov. 8, 1966

3,283,656
COLOR REVERSIBLE ELECTROCHEMICAL LIGHT
FILTER UTILIZING ELECTROLYTIC SOLUTION
Giffin D. Jones and Ralph E. Friedrich, Midland, Mich.,
assignors to The Dow Chemical Company, Midland,
Mich., a corporation of Delaware
Filed Jan. 7, 1963, Ser. No. 249,860
6 Claims. (Cl. 88—107)

This invention relates to an improved electrochemical, substantially transparent, light filter the color of which may be reversibly altered upon the appropriate application of electric current.

Tinted or colored glass has found wide acceptance and applicability. It is useful in situations where direct sun or other light is harmful or undesirable. In such situations the tinted or colored glass may filter out a portion of the light or simply reduce its intensity. Usually, the incident light is undesirably intense only during certain periods of the day. In this situation, it is desirable that the glass be clear or nearly clear at least a part of the time. Eastern exposure windows, for example, would desirably be tinted in the morning and clear during the afternoon. For Western exposure windows, of course, the reverse could be true.

Numerous attempts have meen made to provide light filters of variable absorption. One such attempt is disclosed in U. S. Patent 2,710,274. That patent discloses a method wherein a substantially transparent sandwich of two outside layers of glass and a middle layer of a material whose transparency changes with luminous intensity and/or temperature. These filters have the apparent disadvantage of being dependent on luminous intensity and/or temperature and, to that extent, are not subject to positive control of light transmission.

Other proposed methods of providing a variable intensity light filter include (as suggested in U. S. Patent 2,-953,819) the orientation of small particles contained in a liquid by means of an electric field, thereby altering the transmission of light through the liquid. A method is suggested in British Patent 328,017 wherein a clear solution is caused to develop a color as long as electric current is passed therethrough, the color disappearing and the solution clarifying immediately upon termination of the current. Similarly, in U. S. Patent 2,632,045, an electrochemical color filter is suggested in which the intensity of the color is proportional to the voltage applied thereto. As the potential is decreased, the solution in the filter reverts to its original (usually clear) state.

None of the above methods succeed in a color change which will remain as long as desired without the continuous application of current to the solution in the filter.

We have discovered an electrochemical light filter, the color of which may be reversibly altered and, once formed, will remain over a substantial period of time without further application of electric current thereto. If it is desired to change the color, application of a reverse current for a short period of time will cause the original color to form. This procedure is, of course, reversible.

A better understanding of the present invention together with its attendant objects and advantages will be facilitated by the following specification when taken in conjunction with the accompanying drawings in which:

FIGURE 1 is an isometric view partially in section of one embodiment of the filter of the present invention.

FIGURE 2 is a sectional plan view of the filter of the present invention.

FIGURE 3 is a sectional view of the filter of the present invention which illustrates in more detail the transparent gross electrode.

FIGURE 4 is a sectional view of the filter of the present invention which illustrates in more detail the minor electrode.

In the embodiment illustrated in the drawings, one major internal surface 11 of the filter is treated so as to make a major portion of that side electrically conductive without destroying transparency. A relatively small, inert conductive electrode surface 12 is provided within the filter. In the embodiment illustrated, the electrode surface 12 is in the form of a peripheral strip around the outer edge of major internal surface 14 of the filter. Other configurations are, of course, possible and may also be desirable. Each electrode is provided with means, such as wires 15, to connect an external source of direct current. Sealing means 16 is generally employed to protect the solution from contact with air and to prevent spillage in handling and use.

The filter may be constructed of glass, suitable plastics or any other substantially transparent material which is impervious to the aqueous solution to be retained within the body of the filter. Desirably the transparent material has characteristics which will permit its use as a structural member as, for example, in interior or exterior window glass fixtures.

Ordinarily, the transparent gross electrode will preferably cover the entire surface of one major internal surface of the filter. Suitable materials for forming this transparent electrode are stannic or indium oxide, a metallized coating or a metallic screen of particles sufficiently small that substantial transparency is maintained. The minor, preferably inert, electrode need not be transparent. Silver, platinum, chromium, nickel, tungsten, calomel, or wires coated with these materials or the like may be used, depending on the solution to be contained in the article.

Appropriate aqueous, light transmitting solutions for use in the filter of the present invention are those containing oxyacid anions which contain vanadium, tungsten, or molybdenum. Other ions permissible in the aqueous solutions useful in the filter of the present invention are those which do not form precipitates with the oxyacid anions or other ions present, and are not readily oxidized or reduced. Examples of other ions permissible in the aqueous solution are: sodium, lithium, potassium, ammonium, hydrogen, magnesium, acetate, chloride, sulfate, nitrate, acid phosphate, and the like which exhibit the requisite characteristics outlined above.

Generally the aqueous solution used in the present invention are maintained at a pH of less than 7. As the pH is lowered, the color of the solution usually increases in intensity. Color also tends to intensify with increase in concentration of the oxyacid anion. Oxyacid anion concentration and pH are somewhat interrelated in the preparation of aqueous solutions useful in the present invention. Ordinarily, little color is apparent with solutions having a pH higher than about 6.1. When the oxyacid anion concentration in the solution is about 1.2 molal, color may be obtained at pH values slightly higher than about 6.1. At 1.2 molal concentration of oxyacid anion, however, undesirable precipitation usually occurs when the pH is lowered below about 5.1.

A solution containing oxyacid anion in a concentration of about 0.06 molal generally shows color at pH values as high as about 5, and the pH may be lowered below 1 without precipitation. Ordinarily, oxyacid anion concentrations of about 0.3 molal are used, but a concentration of oxyacid anion as low as 0.003 molal is operable.

In general terms, then, the pH of the solution may range from about 0.5 to about 6.1, and the oxyacid anion concentration may range from about 0.003 molal to 1.2 molal.

Voltage applied between the electrodes should be sufficient to cause current flow, but should be below the gassing limit of the particular cell used. The electrode-electrolyte voltage should be below the accepted decomposition potential (about 2.2 volts). Total voltage applied to the electrodes will, of course, take into account the conductivity of the electrolyte solution and the cell geometry. For instance, if the voltage drop across the electrolyte in the particular cell to be used were one volt, and three volts were applied between electrodes, the electrode-electrolyte voltage would be two volts and thus below the 2.2 volts gassing limit.

In some instances it may be desirable to mix into the solution a freezing point depressant such as an alcohol or the like. Further, in some applications the addition of a gelling agent may be desirable, mainly to prevent leakage. None of these are essential. The use of these additives such as an anti-freeze of the alcohol type or a gelling agent, should be considered in light of the particular metal-containing ions contained in the solution. Some alcohols may react with the ion in solution and would thus be undesirable. Tertiary alcohols, however, and particularly tertiary-butyl alcohol, are generally useful as anti-freeze additives in the present invention.

A wide variety of gelling agents such as sulfonated polyvinyl aromatics or polymers of sulfonated aromatic monomers may also be employed, if desired.

Maximum color stability may be obtained by protecting the solution from contact with air. When the solution is so-protected, color formed by the passage of current through the solution will usually remain for at least several hours or until a current is passed through the solution in the reverse direction.

The present invention may be more readily understood in light of the following examples which are set forth to illustrate, and are not to be construed to limit, this invention.

*Example 1*

A container having internal dimensions of 3 x 5 x ¼ inches was fabricated of glass. One major interior surface was made conductive by a transparent coating of tin oxide. Around the periphery of the other major interior surface was painted a thin strip of silver. Wires were attached to the conductive glass and to the silver strip.

A solution was pepared by dissolving six grams of sodium tungstate ($Na_2WO_4 \cdot 2H_2O$) in one hundred milliliters of water. Hydrochloric acid was used to adjust the pH of the solution to about 2.5. In order to thicken the solution, three grams of the sodium salt of sulfonated polyvinyltoluene was mixed therewith.

This solution was used to fill the above described container. The wires attached to the conductive glass and the silver strip were connnected to a source of direct current in such a manner that the conducting glass was a negative electrode and the silver strip a positive electrode.

Upon application of a potential of about 1.5 volts between the electrodes the solution became colored deep blue in about five minutes. After several hours of standing with no potential between the electrodes, no observable diminishing of the blue color was noted. Upon a reversal of polarity of the electrodes at the same potential, the color disappeared. This cycle was repeated many times with no observable difference in effect.

When a potential of about 3 volts between the electrodes was used, the coloring and fading processes were accelerated, and no gassing was observed.

It was also found that potassium or magnesium tungstate could be substituted for sodium tungstate as shown above with substantially the same results.

*Example 2*

A solution was prepared by mixing 0.5 gram of sodium molybdate ($Na_2MoO_4 \cdot 2H_2O$) in fifty milliliters of water. The solution was acidified to about pH 2 and used to fill a container similar to that described in Example 1. With the conductive glass electrode negative, a current of 0.4 milliampere caused the solution to turn blue. After several hours of standing with no current flow through the solution, no observable diminishing of the blue color was noted. Upon reversal of polarity of the electrodes, the color faded out. After several reversals of polarity the formation and disappearance of color continued to occur with no observable difference in effect.

With the pH of the above solution adjusted to about 5, similar results were obtained but with formation of a yellow-brown color.

Platinum wire or calomel may be substituted for the silver electrode used above with substantially similar results.

*Example 3*

A solution containing about 0.6 gram of vanadium pentoxide ($V_2O_5$) in about 50 milliliters of aqueous sulfuric acid was made up and the pH adjusted to about 3. This solution was used to fill a container similar to that described in Example 1. With the conducting glass electrode cathodic, a current of about 3 milliamperes was passed through the solution which turned from yellow to green. After several hours of standing with no current flow through the solution, no observable diminishing of the green color was noted. Upon reversal of the direction of current flow, a reversal of color was obtained.

Various modifications may be made in the present invention and it is to be understood that we limit ourselves only as defined in the appended claims.

We claim:

1. In an electrochemical light filter having a transparent gross electrode, a minor electrode in spaced relationship to the gross electrode and which is spaced and positioned to allow the passage of light, a light transmitting electrolyte occupying the space between said electrodes, an electrical power source and means for reversibly applying such power to the electrodes, the improvement which comprises providing as said electrolyte a coloring amount of an aqueous solution of an oxyacid anion selected from the group consisting of vanadate, tungstate and molybdate having a pH of less than about 6.1 whereby the color of the aqueous solution is altered by sequentially applying pulses of electrical power of opposite polarity.

2. The electrochemical light filter of claim 1 wherein the pH of the electrolyte is from about 0.5 to about 6.1.

3. The electrochemical light filter of claim 1 wherein the aqueous electrolyte solution contains a coloring amount of a tungstate oxyacid.

4. The electrochemical light filter of claim 1 wherein the aqueous electrolyte solution contains a coloring amount of a molybdate oxyacid.

5. The electrochemical light filter of claim 1 wherein the aqueous electrolyte solution contains a coloring amount of a vanadate oxyacid.

6. The electrochemical light filter of claim 1 wherein the oxyacid anion concentration is between about 0.003 and about 1.2 molal.

References Cited by the Examiner

UNITED STATES PATENTS

| | | | |
|---|---|---|---|
| 1,870,017 | 8/1932 | Michelssen | 88—61 |
| 2,632,045 | 3/1953 | Sziklai | 88—107 X |
| 2,710,274 | 6/1955 | Kuehl. | |
| 2,953,819 | 9/1960 | Holoubek et al. | 106—291 |

FOREIGN PATENTS 328,017    4/1930    Great Britain.

DAVID H. RUBIN, *Primary Examiner.*

J. G. BOLTEN, *Assistant Examiner.*